United States Patent [19]

Thaler et al.

[11] 4,122,443
[45] Oct. 24, 1978

[54] CHARACTER POSITION DETECTOR

[75] Inventors: Michael Thaler; Stephen Jackson, both of East Hartford, Conn.

[73] Assignee: Scan Optics, Inc., East Hartford, Conn.

[21] Appl. No.: 809,695

[22] Filed: Jun. 24, 1977

[51] Int. Cl.² .................................. G06K 9/04
[52] U.S. Cl. .................. 340/146.3 H; 340/146.3 MA
[58] Field of Search ............. 340/146.3 H, 146.3 MA, 340/146.3 AC, 146.3 AE, 146.3 R; 364/900

[56] References Cited

U.S. PATENT DOCUMENTS

| | | | |
|---|---|---|---|
| 3,295,105 | 12/1966 | Gray et al. | 340/146.3 H |
| 3,462,737 | 8/1969 | Malaby | 340/146.3 H |
| 3,710,323 | 1/1973 | Andrews et al. | 340/146.3 H |
| 3,761,876 | 9/1973 | Flaherty et al. | 340/146.3 MA |
| 3,781,799 | 12/1973 | Robinson | 340/146.3 MA |
| 4,034,343 | 7/1977 | Wilmer | 340/146.3 MA |

OTHER PUBLICATIONS

Bond et al., "Video Pattern Preprocessor for Software Character Rec.," *IBM Tech. Disclosure Bulletin*, vol. 15, No. 8, Jan., 1973, p. 2445.

Primary Examiner—Leo H. Boudreau
Attorney, Agent, or Firm—Brumbaugh, Graves, Donohue & Raymond

[57] ABSTRACT

In a character recognition system lines of data are stored in a line memory. This data is then accessed by a hardware implemented character position detector over a special line memory bus, i.e., a LM-bus. The detector searches the memory for the margins of characters and can also perform a count of the black points or character points within the margins. The position detector is activated by a system controller over a B-bus, but once started by the controller it will run on autonomously until it has completed its task, thereby leaving the processor and the B-bus available for other functions.

5 Claims, 5 Drawing Figures

FIG. 3

4 x 4 PATTERN AS READ OVER L.M. BUS

POSITION 1 SEARCH PATTERNS

POSITION 2 SEARCH PATTERNS

FIG. 4

CHARACTER POSITION DETECTOR

BACKGROUND OF THE INVENTION

The present invention relates to character recognition systems and, more particularly, to character position detectors for use in character recognition.

In character recognition systems the document to be read is located in a reading station by means of a document transport. At the reading station the difference in reflectance between a character and the document background is detected optically and is converted into an electrical signal that is stored in a memory. Typically this conversion is done a line at a time and the data is stored in a line memory. Once in the line memory the data can be searched to locate the character margin or perimeter and processed (e.g. thinned and scaled) as shown in U.S. Pat. No. 3,541,511 issued to Genchi et al. Then the data is transferred to a classifier memory where the character is identified, e.g. by comparing the data to character masks such as is explained in U.S. Pat. No. 3,766,520 issued to Patterson.

The typical position detector is a program in the system controller or processor. This program checks the memory locations in some pattern, searching for black/white or white/black transitions that indicate either the perimeter of the character or at least the left, right, top and bottom margins of the character. Essentially the position detector program requests a word, from the line memory over the controller's operating or B-bus. Once in the controller's internal memory, the data is compared to see whether it is the same as the previously selected data bit in the series, i.e. is it a transition bit. If the bit is a transition bit its position is recorded at the controller's memory and the next bit is brought to the controller from the line memory. After the search sequence is completed the address of the transition bits that are leftmost, rightmost, uppermost and lowermost are used as the margin of the character.

During the period when the position search is going on the system controller and the B-bus are occupied and cannot perform other functions, such as reading new data at the read station or transferring character fields, i.e. the data within the margins located by the position program, to the character memory for identification. Also, the operation of a programmed search is inherently much slower than a hardware implemented search. Therefore an improvement in character recognition systems could be achieved if the character position detection were carried out independent of the system controller and B-bus by a hardware device.

SUMMARY OF THE INVENTION

The present invention is directed to providing a character position detector for a character recognition system which allows the line memory to be searched at high speed, independent of the system controller and its operating bus. This object is achieved by implementing the character position detector from hardware units so as to be able to automatically access the line memory over a separate line memory bus.

In an illustrative embodiment of the invention the position detector circuit has a count-down counter which can be loaded with the search limits via the B-bus. A set-up latch also receives initiation information for the search, e.g. stop conditions and the type of search desired. The starting X and Y address coordinates are supplied to the line memory via the B-bus.

Once the initial conditions have been set up in the line memory and the position detector, the position detector directly obtains a 4×4 data array from the line memory via the special line memory bus and a 2×4 portion of it is supplied to a data latch. The contents of this latch are processed in a PROM which determines if there is a black/white or white/black transition in the array and the total black count. When a transition is detected it is compared with the stop conditions in an AND gate and the black count is added to the previous black count in a black point adder. The operations of the position detector are controlled by a state counter and the process continues until the limit counter reaches zero or a stop condition is reached. At this point a flag is set on the B-bus to let the controller know that the process is complete. On command from the controller the position detector puts the results of the search on the B-bus.

BRIEF DESCRIPTIONS OF THE DRAWINGS

The foregoing and other features of the present invention will be more readily apparent from the following detailed description and drawings of an illustrative embodiment of the invention in which:

FIG. 3 illustrates the search patterns used by the circuit of FIG. 1; and

FIG. 4 is a diagram of the program used in the PROM of FIG. 2.

DESCRIPTION OF AN EXEMPLARY EMBODIMENT

Figure 1:
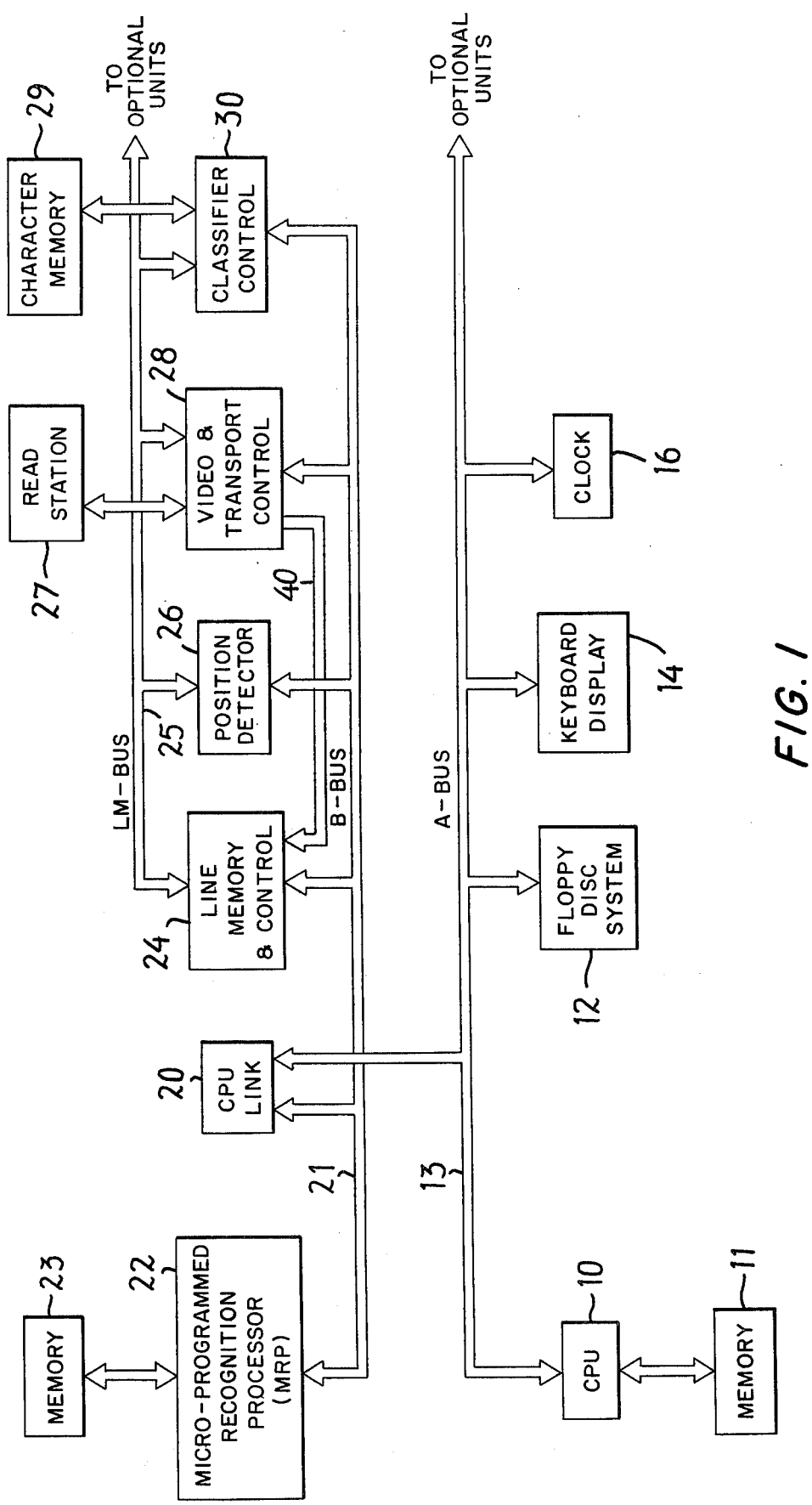
FIG. 1 is a block diagram of a character recognition system indicating the location of a character position detector.

A character recognition system is shown in block diagram form in FIG. 1. External control of this system is maintained by a central processing unit (CPU) 10, such as a Hewlett-Packard computer model 21MK with its associated 16K memory 11. The computer 10 interfaces with other units along a single bus 13, labeled the "A-Bus." Connected to the A-bus is a floppy disc memory system 12, such as the Shugart 801 disc system, which is an inexpensive way of providing additional memory space. The floppy disc system may be used to store operating parameters or as an output storage for the system. In order for the operator to instruct the system about the size of the document, the type of font used, the location of the data, etc., a keyboard and CRT display unit 14 is provided. This may be a Computer Peripheral Corp. model CP-10 unit. A system clock 16 may also be attached to the A-Bus to provide timing in a conventional manner.

The CPU, floppy disc and keyboard are used to set up or initialize the system prior to reading a document, but the recognition of characters is carried out by a microprogrammed recognition processor (MRP) 22 connected to the A-Bus via a CPU link 20. The CPU link is a set of receivers, drivers and decoders that condition signals from the CPU 10 so that they can be accepted by the MRP. The MRP 22 may be a conventional processor such as a Hewlett Packard 21MK, an especially designed processor made from integrated circuits such as the bit slice microprocessor chips in the 2901 series manufactured by American Micro Devices, or a simple sequencer. Naturally more speed and versatility can be achieved by making the use of a processor for the MRP in connection with its own memory 23, but this forms no part of the present invention.

Once the CPU 10 has established the initial conditions, control of the system is turned over to the MRP 22. The MRP operates to control the system by means of a bus 21 known as the B-bus. Data, addresses and control signals are communicated between the MRP and the other sub-assemblies of the system over the B-bus. The sub-assemblies include a video and transport control unit 28 which causes a document to be incrementally moved pass a read station 27 where a line of data is read after each incremental move and is stored in a line memory 24 via transport bus 40. A line memory useful for this purpose is disclosed in copending patent application Ser. No. 809,697 filed June 24, 1977 by Thaler et al. and assigned to the assignee of the present invention. The transport can be any convenient incremental document drive, but the document transport described in copending patent application Ser. No. 809,692 filed June 24, 1977 by Daley et al. and assigned to the assignee of the present application is particularly suited for this purpose. Also the read station can be a charge coupled device, such as the Fairchild CCD-121H with suitable lenses to image a line of data on it and suitable amplifiers and level discriminators to generate a line of binary data.

After a sufficient number of lines have been stored to form at least one character field the MRP activates the position detector control 26 of the present invention which locates the left, right, top and bottom margins of the character. In some cases this unit may also be used to determine the total number of black points, i.e. character data points within the character margins, as an aid to the identification of the character. All of these operations by the position detector are performed independently of the MRP and the B-bus. Instead data is transferred over a line memory (LM) bus 25 at the command of the position detector. Upon completion of the margin search, data within the character margins is then transferred to the character memory 29 via the classifier control 30 and the LM-bus. The MRP signals the classifier control when the position control has completed its task and sets the classifier into operation. In the classifier the data within the margins is compared to character masks and the one which most closely matches the data, i.e. the mask that receives the highest comparison score, is selected as the output and is fed to the CPU via the B-bus, the CPU Link 20 and the A-bus. This type of process is described in more detail in U.S. Pat. No. 3,766,520 to Patterson and in the service manual for the Scan Optics Model 530/540 character recognition systems, pertinent portions of which are incorporated herein by reference.

Figure 2A:
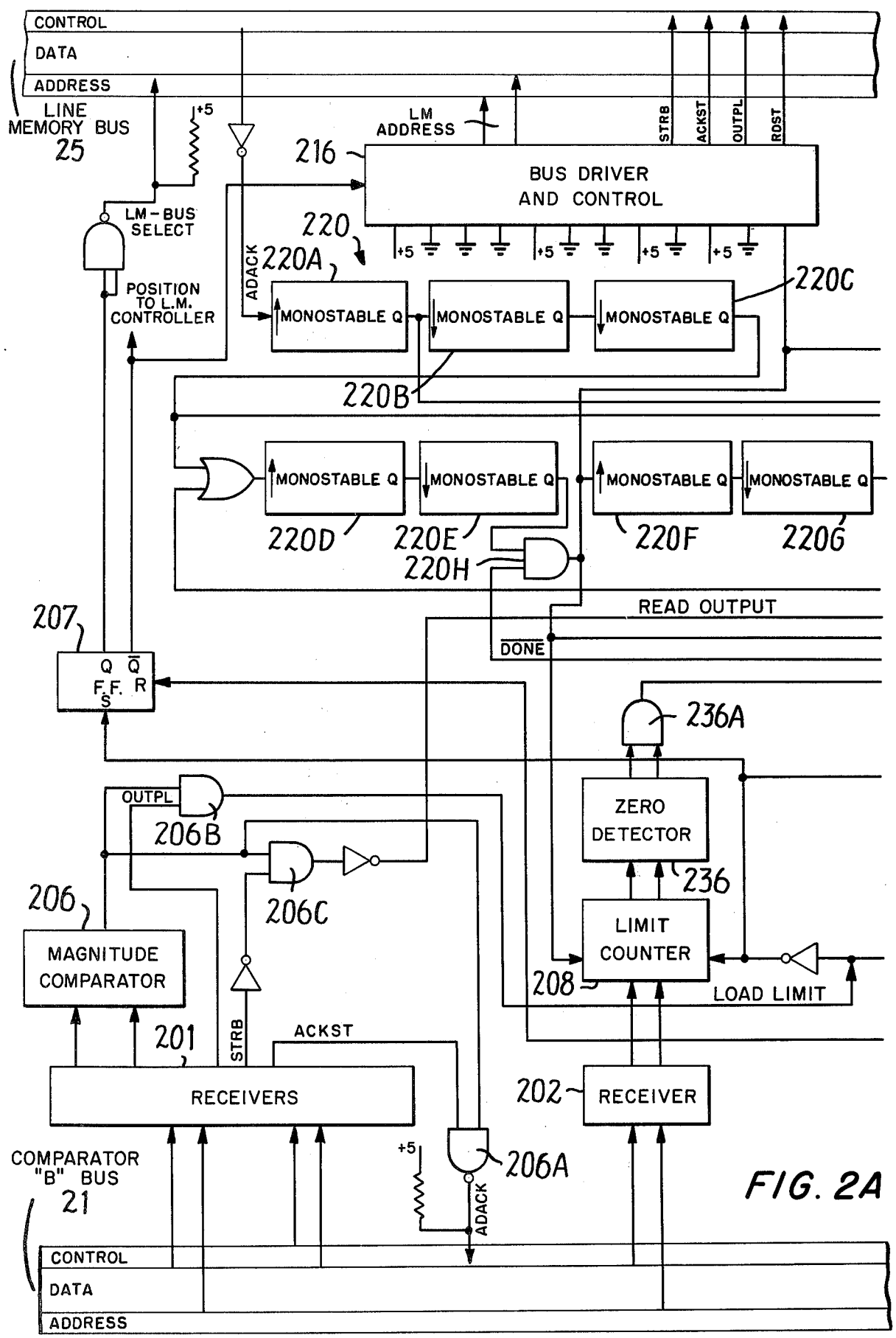
FIGS. 2A and 2B are a schematic diagram of a character position detector according to the present invention.
Figure 2B:
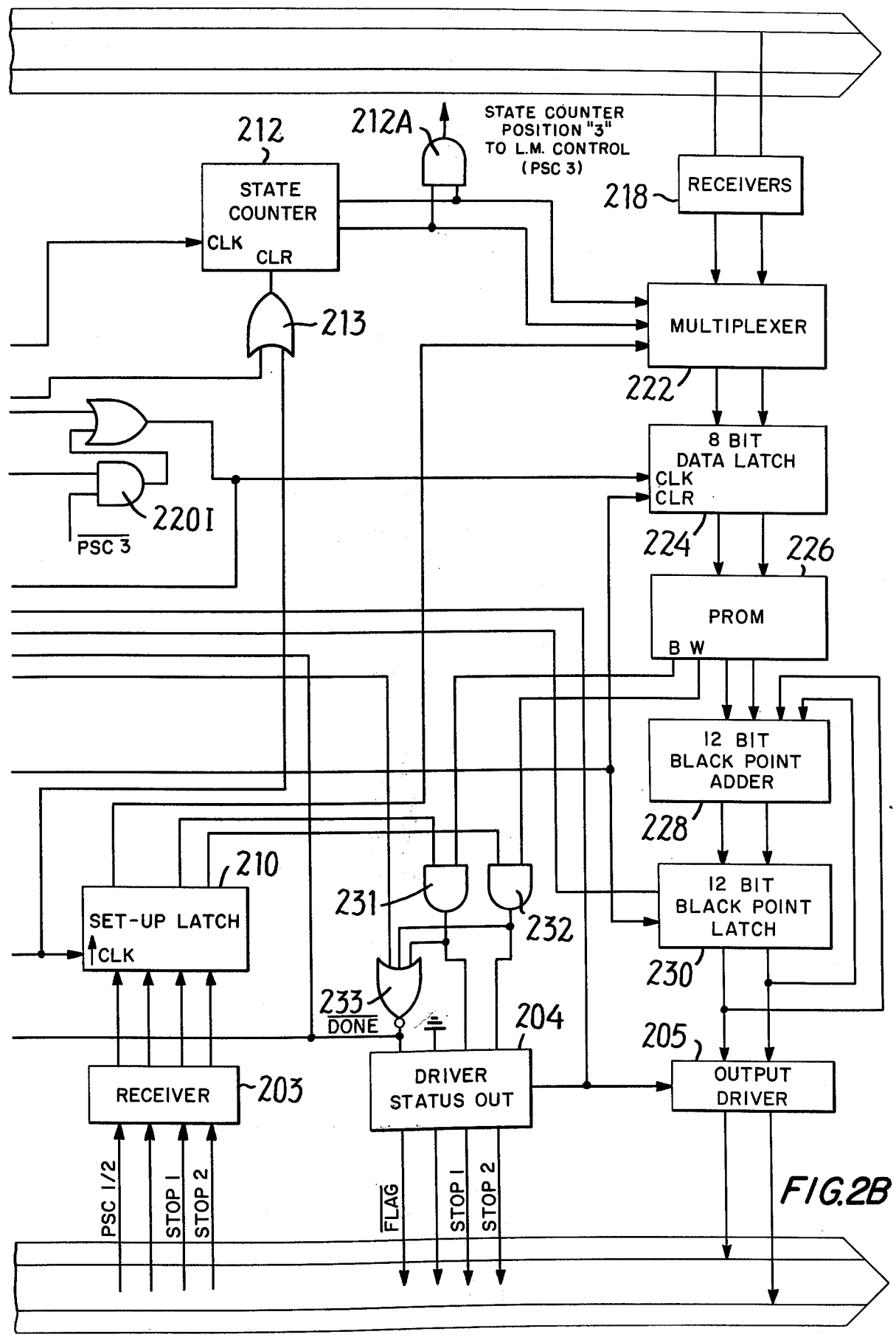

The character position detector and control that allows for this type of operation is disclosed in FIG. 2. The detector is activated by a 16 bit word supplied over the B-bus 21 from the MRP. By way of example, bits 0–11 are binary integers representing the maximum number of increments to be used in the search before stopping. Bits 12 and 13 represent stop conditions 2 and 1, respectively. Bit 14 is not used and bit 15 selects search pattern 1 or 2, i.e. the 4×2 or the 2×4 search patterns of FIG. 3. Once the search has been completed the detector generates a 16 bit word on the B-bus. The 0–11 bits represent the black point count, bits 12 and 13 are stop conditions 2 and 1, bit 14 is not used and bit 15 is a $\overline{FLAG}$ signal. A "1" at bit 12 or 13 indicates that the search stopped on one of these conditions. The $\overline{FLAG}$ signal indicates that the detector is no longer busy in a search mode.

The input data word supplied on the B-bus is received in the position detector by three receiver circuits 201–203, which are typically standard integrated circuit units No. 8T37, made by various manufacturers. The outputs from the detector onto the B-bus are by means of driver circuits 204 and 205 which are integrated circuits No. 74368. A magnitude comparator 206, e.g. a DM8160, checks the input to see if it has the address code of the detector. If it does the output of the comparator is combined in AND-gate 206A with a ACKST (i.e. acknowledge strobe) on the B-bus and produces an ADACK (i.e. an address acknowledge) signal back on the B-bus which tells the MRP that the message has been received. The output of the address comparator is also ANDed in gate 206B with a OUTPL (load data) signal from the B-bus to create a LOAD LIMIT signal that activates a limit counter 208 (comprising e.g. No. 74 LS 193 units) and a set-up latch 210 (comprising e.g. No. 74 LS 174 units) to receive data from the B-bus. The bits 0–11 load the number of search increments into the limit counter 208 and the position and stop conditions are loaded into the latch 210. The LOAD LIMIT signal that activates the load lines on the counter 208 and the latch 210 also resets a state counter 212 through an OR-gate 213 and sets a flip-flop 207. Flip-flop 207 generates a line memory bus select signal which acts to activate the line memory and a set of drivers 216, e.g. No. 74368 integrated circuit units. The inputs to these drivers are wired so as to generate the address code for the line memory and the STRB, ACKST, OUTPL and RDST control signals used in the line memory. The operation of these control signals in the line memory are described in the previously mentioned copending application Ser. No. 809,697 of Thaler et al. The RDST signal, however is not fixed, but is generated in the position detector.

In making a search a 4×4 array of data such as shown in FIG. 3 is requested by the position detector over LM-bus 25 and is supplied by the line memory over that bus. Since the 4×4 array actually represents three search patterns, the operation is about 45% faster than going to the line memory three times.

When the line memory transfers the first 4×4 array to the position detector over the LM-bus the signals are received in receivers 218 which can be 8T37 units. The address where the search is to begin and the location of successive arrays transferred are established in the line memory by the MRP. The line memory also sends an ADACK, i.e. address acknowledge, signal which is used to trigger a pulse generator 220 which may be comprised of a series of seven monostable multivibrations 220A–220G. The output of the first monostable 220A clears the state counter 212 through OR-gate 213. A DONE signal, which will be explained later, is combined with the output of monostable 220E in an AND-gate 220H to generate the RDST signal that is used to clock state counter 212. The RDST (read strobe) is also supplied to the line memory via driver 216 and requests a new 4×4 array each time it is generated. The output of the state counter and the pattern select (POS ½) output of latch 210 control a group of multiplexers 222 (e.g. integrated circuit units No. 74151) which select one of the six 2×4 search patterns depending on the pattern desired and the state of the search sequence. Once selected the 2×4 array is loaded into a latch 224 by either the output of the third monostable 220C or the output of the seventh monostable 220G and the inverse of the three count (PSC3) of state counter 212. The three count is derived from an AND-gate 212A attached to the output of the state counter. The signal that loads latch 224 is fed back to the input of the fourth monostable 220D and passes through to the seventh monostable 220G again. While passing through these monostables, the signal increments the state counter to select a different 2×4 array before activating the load lines of latch 224 again. At the three count of the state counter, PSC3, the AND-gate 220I at the output of the seventh monostable blocks further loading of the latch unitl a new ADACK signal is received from the line memory in response to a RDST signal.

The contents of latch 224 are analyzed by a PROM 226, which may be a 74 S 471 unit. A typical program for the PROM 226 is shown in FIG. 4. In FIG. 4 various 2×4 arrays with "1" bits in various locations are shown. The numbers at the bottom of each array in FIG. 4 represent the black count and the letters, i.e. B or W, represent whether the array is considered black or white. When both letters are present and one is in a block, a black/white or white/black transition is indicated. On the output of PROM 226 a four bit number represents the black count and is transferred to a black point adder 228, which can be an arrangement of 74 LS 83 units. The black and white outputs are applied to AND-gates 231 and 232, respectively, which also receive the stop 1 and stop 2 conditions from set-up latch 210. Hence the stop 1 condition will cause the search to stop when the first black array is found and the stop 2 condition will do the same on the first white array. This allows the beginning or end, top or bottom, respectively, to be determined. Naturally it is not necessary to use these stop conditions if a complete sweep of the data field is desired, e.g. when a total black count in the character field is desired. Such a black count is useful in classifying characters that have interior islands, e.g. the FIGS. "B" and "8". The occurrence of either stop condition is combined in NOR-gate 233 to generate the $\overline{\text{DONE}}$, i.e. as long as neither has occurred the process is not complete and flip-flop 207 continues to access the line memory.

The signal from the fifth monostable 220E in pulse generator 220 combined with the $\overline{\text{DONE}}$ signal also clocks the limit counter 208 which acts to reduce its count by one. This signal also activates a black point latch 230 to receive the sum generated by the black point adder 228. In order to determine if the total number of input increments have been executed by the limit counter, a zero detector 236 determines when the count reaches zero. The zero detector may comprise two 6 bit magnitude comparators (DM 8160) whose outputs are combined in an AND-gate 236A. Since this is also an end of search condition, the output of the AND-gate 236A is also applied to NOR-gate 233. Therefore, if the stop conditions are not met, the operation will continue until the total number of increments are completed. The $\overline{\text{DONE}}$ signal is also the $\overline{\text{FLAG}}$ signal. Therefore the MRP will know when the sequence is complete by determining if the flag is set.

As state counter 212 goes through its three states (0, 1 and 2) selecting the portions of the 4×4 array shown in FIG. 3, the previous black point sum stored in latch 230 is combined with the new black point data in black point adder 228. Consequently, the total black point count at the end of the process is stored in black point latch 230 and is available to driver circuit 205. The state counter on the three count, PSC3, acts with RDST as a strobe, to the line memory requesting the next 4×4 array for processing by the character position detector.

The MRP periodically checks the B-bus to see if the position detector flag is set. Once it has been set the MRP requests the results of the search by sending the address of the position detector and a STRB (line strobe) command over the B-bus. The STRB signal from receivers 201 is combined in AND-gate 206C with the output of the magnitude comparator 206 to generate a read output signal that activates drivers 204 and 205 so that their inputs are transferred to the B-bus.

While the invention has been particularly shown and described with reference to a preferred embodiment thereof, it will be understood by those skilled in the art that various changes in form and details may be made therein without departing from the spirit and scope of the invention.

We claim:

1. A character position detector of a character recognition system for locating the left, right, top and bottom margins of character fields stored within a line memory provided with a line memory bus capable of receiving and transmitting data independent of a system controller and controller bus, comprising:
   decoder means for decoding a request for character position information supplied over the controller bus and for requesting a two-dimensional array of line memory data over the line memory bus;
   multiplexer means for sequentially selecting various sub-sets of the two-dimensional array, the form of the sub-sets being determined by information supplied over the controller bus and decoded in said decoder means;
   latch means for sequentially storing the various sub-sets of the two-dimensional array;
   programmable read only memory for producing transition outputs related to whether the sub-sets contain transitions from the background to the character and vise versa according to a prearranged convention;
   a state counter for controlling the selection process by said multiplexer means; and
   a timing chain for clocking said state counter and for the loading of said latch means.

2. A character position detector as claimed in claim 1 further including a loadable count-down counter and a zero detector means, said counter being loaded via the controller bus with the number of two dimensional arrays that should be searched to find the margin of a character field and being counted down for each transfer of a two-dimensional array over the line memory bus, the transfer of two-dimensional arrays being halted when the zero detector indicates that the count-down counter has reached zero.

3. A character position detector as claimed in claim 2 wherein said programmable read-only memory also determines a total number of character bits in each sub-set and wherein said position detector further comprises an adder circuit and a second latch means for storing the output of said adder circuit, the total number of character bits from said read-only memory being added in said adder to the total character bit count stored in said second latch means, and the result of the addition being stored in said second latch means as a new current total character bit count.

4. A character position detector as claimed in claim 2 further including a set-up latch means for storing information from the controller bus concerning the form of the sub-sets desired and whether the search should stop on the location of a character bit or a background bit independent of the total number of two-dimensional arrays requested to be searched.

5. A character position detector as claimed in claim 4 further including a coincidence circuit means for determining when either of the stop conditions stored in said set-up latch matches the transition outputs of the read only memory and further including a search complete circuit which produces an output when either the zero detector means or the coincidence circuit means produces an output.

* * * * *